May 10, 1949. R. J. SCHMERBER 2,469,790
AUTOMATIC MACHINE FOR ELECTRIC ARC WELDING
Original Filed Nov. 18, 1946 3 Sheets-Sheet 2

INVENTOR
Raoul J. Schmerber

May 10, 1949.  R. J. SCHMERBER  2,469,790
AUTOMATIC MACHINE FOR ELECTRIC ARC WELDING
Original Filed Nov. 18, 1946  3 Sheets-Sheet 3

INVENTOR
RAOUL J. SCHMERBER

Patented May 10, 1949

2,469,790

UNITED STATES PATENT OFFICE 2,469,790

AUTOMATIC MACHINE FOR ELECTRIC ARC WELDING

Raoul Jean Schmerber, Uccle, Belgium, assignor to La Soudure Electrique Autogene, Societe Anonyme, Brussels, Belgium Original application November 18, 1946, Serial No. 710,459. Divided and this application September 28, 1948, Serial No. 51,613. In Belgium November 22, 1945

3 Claims. (Cl. 314—39)

The present invention relates to an automatic arc welding machine in which the electrode advances continuously towards the work by means of a motor carried by a head through which the electrode passes and in which said head is carried by a carriage movable above the work to be welded.

The present invention is a division of my copending application 710,459 for "Automatic machine for electric-arc welding" filed November 18, 1946.

It is known to impart to said head a transverse rocking movement relatively to the direction of displacement of said carriage, the amplitude of said movement being adjustable according to the width or the thickness of the joint to be welded.

The present invention has for its object a specific mechanism for varying the amplitude of this movement.

The accompanying drawings show by way of example one embodiment of the machine according to the invention.

Figure 1:
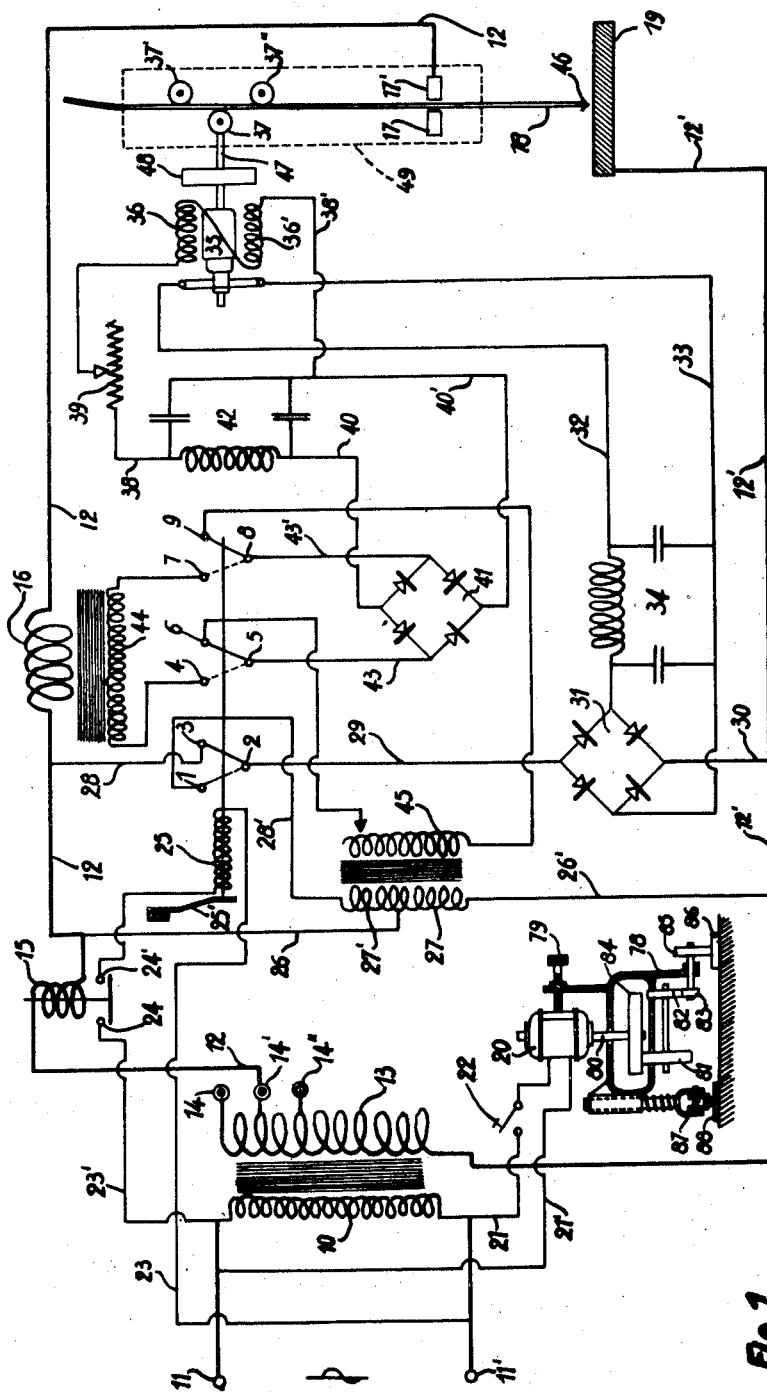
Fig. 1 shows a circuit diagram of an automatic machine for electric-arc welding according to the invention.

In Fig. 1, 10 is the primary of a welding transformer which is connected to the alternating current voltage 11—11'. The welding circuit 12—12' of the machine is connected, on the one hand and in known manner, to the secondary 13 of the welding transformer by means of one or other of the current adjusting tappings 14—14'—14''. In said welding circuit 12—12' are connected in series the coil of a current relay 15, the primary 16 of a current transformer and two brushes 17—17' for supplying the welding current to the welding head, on the outer conducting surface of a continuous electrode 18 which can close the circuit 12—12' on the part to be welded or welding plate 19 which is connected, on the other hand, to the secondary 13 of the welding transformer.

20 is the translation motor for the carriage, directly connected to the alternating current voltage of the supply 11—11' through the circuit 21—21' containing a switch 22. Said motor 20—the functions of which will be more fully described hereinafter—may be quite an ordinary universal type series motor, the only special characteristic which it must have being a stable speed.

Similarly, a circuit 23—23' containing the armatures 24—24' of the current relay 15, is directly connected to the alternating current voltage 11—11' and said circuit is intended to supply the attraction coil 25 of an automatic reversing switch with three circuits, the respective contacts of which are designated by 1—3, 4—6 and 7—9 and the corresponding inputs by 2, 5 and 8. The position shown for said reversing switch is that of no-load operation. The reversing switch is permanently urged towards this position, for example, by a spring 25'.

Through 26—26' is directly connected across the welding circuit 12—12', a predetermined portion 27 of the convolutions of the primary winding of an auxiliary transformer, the other part 27' of which may (through 26, 27', 28', the closed contact 1—2, 29 and 30) supply the current rectifier 31.

Through 28, 29 and 30, the closed contact 3—2 shunts the current rectifier 31 directly across the welding circuit, the output circuit 32—33 of said rectifier containing the choke-capacity system 34 which is intended, in known manner, to smooth the rectified current, and said output circuit 32—33 is normally connected to the terminals of the armature winding 35 of a motor with field winding 36—36'.

By means of its shaft 47 and of a speed reducer, the drive shaft of which is not shown in Fig. 1, said motor with independent excitation or motor for regulating the feed of the electrode, drives a set of feed rollers such as 37, 37', 37'' provided in the welding head, other mechanical peculiarities of which will be described hereinafter.

The circuit 38—38' of the field winding 36—36' of the feed motor, includes the control rheostat 39 and is connected to the output circuit 40—40' of a rectifier 41, through the choke-capacity smoothing system 42. The input terminals of the rectifier 41 are connected, through 43—43'' to the terminals 5 and 8 respectively corresponding to the contacts 4—6 and 7—9 of the aforesaid reversing switch.

The contacts 4 and 7 are connected to the two respective ends of the secondary 44 of the current transformer, the primary 16 of which, as already mentioned, is in series with the welding circuit 12—12'. On the other hand, the contacts 6 and 9 are connected to the secondary 45 of the auxiliary transformer, a portion 27 of the primary of which, as already mentioned, is directly shunted across the welding circuit 12—12', whereas the other portion 27' may, by closing the contact 1—2, be shunted across the welding circuit, in order to supply the current rectifier 31.

In these conditions, the primary winding 27 performs the function of an auto-transformer having a voltage directly proportional to the arc voltage of the welding circuit 12—12' and, for a suitably chosen ratio 27—27', said winding can supply a rectified and smoothed auxiliary voltage of about double the arc voltage.

The arrangement described operates as follows:

The members of the machine being assumed to be in the position for no-load operation, the rheostat 39 of the feed regulating motor is adjusted to a speed of feed of the electrode dependent on the gauge or diameter of said electrode and/or on the kind of joint to be welded.

The kind of electrode used by the machine is a metal electrode which is adapted to receive the supply of welding current on its outer surface, for example, an electrode of the so-called "cored" type. The reversing switch (1—9) being open for no-load operation, as shown in the diagram of Fig. 1 the electrode 18, which is of indeterminate length and is supplied from a roll mounted on a reel, not shown, has first to be passed through the feed members 37, 37', 37'' and through the electric contact members 17—17' of the welding head. This insertion of the electrode 18 in the welding head may be effected automatically. For this purpose, the welding circuit 12—12', which is connected at 14' for example, is energised by bringing into operation the welding transformer (10—13) by means of a switch or contact not shown in the drawing. As soon as the welding circuit is energised, the feed regulating motor starts rotating. The terminals of its armature winding 35 are supplied by the output circuit 32—33 of the rectifier-smoothing device 31—34 which is connected in parallel to the circuit 12—12' (through 28, 3—2, 29 and 30), whereas through 38—39 and 38', its field winding 36—36' is connected to the output circuit 40—40' of the rectifying-smoothing system 41—42 which is connected to the secondary 45 of the auxiliary transformer, the primary portion 27 of which is directly connected in parallel to the circuit 12—12' through 26 and 26'. The free end of the electrode being inserted through the upper part of the welding head, between the rotating rollers 37, 37', 37'', said rollers "suck in" said end and pass it between the electric contact brushes 17—17' and out through the lower part of the welding head. When the electrode has been thus engaged, the switch is operated to cut off the current from the welding transformer (10—13) and thereby stop the electrode feed motor. The free end of said electrode is then provided with a fuse 46, such as described in my copending application 710,458, for: "Method for striking the welding arc in automatic electric-arc welding machines" filed November 18, 1946.

After this, the automatic welding operation can be started forthwith. The welding transformer (10—13) is switched on and starts again on no load the feed motor for the electrode 18 which is provided with the fuse 46. As soon as said fuse, as the electrode is fed, touches the work 19 and thus closes the welding circuit on the electrode 18 (through 14', 12, 18—19, 12', 13), it catches fire by Joule effect, as described in the aforesaid patent application.

The arc having been struck forthwith, the speed of the feed regulating motor increases, while acting to regulate the length of the welding arc which has been struck and the speed of operation under load is automatically obtained after a few tenths of a second during which care should be taken to close the switch button 22 of the translation motor 20 for the carriage. All the remainder of the operation has been automatically effected by the closing of the welding circuit 12—12' on the electrode 18, since the current relay 15 has operated and closed (through 23', 24, 24' and 23) the circuit of the attraction coil 25 of the reversing switch (1—9), and said switch has connected (through 26, 26', 1—2, 29 and 30) the auto-transformer portion 27' of the primary of the auxiliary transformer to the rectifying smoothing system 31—34 which (through 32, 33) supplies the armature winding 35 of the feed regulating motor and simultaneously connects (through 4—5, 43, 43' and 8—7) the secondary 44 of the current transformer 16, in order to supply the rectifying smoothing system 41—42 to which is normally connected the field winding circuit (38, 39, 36—36', 38') of the feed regulating motor.

In this state of operation under load, it will be seen, on the one hand that the armature winding 35 of the feed regulating motor uses a value of auxiliary voltage which is directly proportional to the arc voltage and which may, as already mentioned, be double said arc voltage which alone, is too weak to produce the requisite speeds of rotation of the armature winding 35 under load and, consequently, of the shaft 47 of the feed regulating motor, and, on the other hand, that the excitation circuit of said motor is supplied with a voltage which is proportional to the welding current. In fact, if the welding current increases, the excitation voltage increases and, consequently, the speed of the motor decreases and the arc tends to become longer. Conversely, if the welding current decreases, the excitation voltage decreases, the speed of the motor increases and the arc is shortened. On the other hand, if the arc voltage tends to decrease (short arc), the speed of the motor decreases, the arc becomes longer and if the arc voltage tends to increase (long arc) the speed of the motor increases and the arc is shortened.

From this conditioned proportional equilibrium between the values of the alternating welding current and of alternating current arc voltage, is essentially obtained the automaticity of the regulation of the machine, for a constant length of arc which is predetermined by a sufficiently accurate adjustment of the rheostat 39 for the excitation of the motor regulating the feed of the electrode. However, in order to prevent small variations of length of the arc disturbing the regular operation of said motor, the shaft 47 of same is provided with a flywheel 48 which is intended to absorb, by its inertia, the very small speed variations and prevent "pumping" phenomena in the length of the arc.

However, apart from the fact that the machine should be able to use electrodes of various diameters in order to deposit strings of welds of different thickness and width, such width and also the quality and the appearance of said string depend also on the regularity of a swinging motion which the welding electrode, during its regulating feed towards the work, should be able to effect transversely to the direction of displacement of said carriage.

Figure 2:
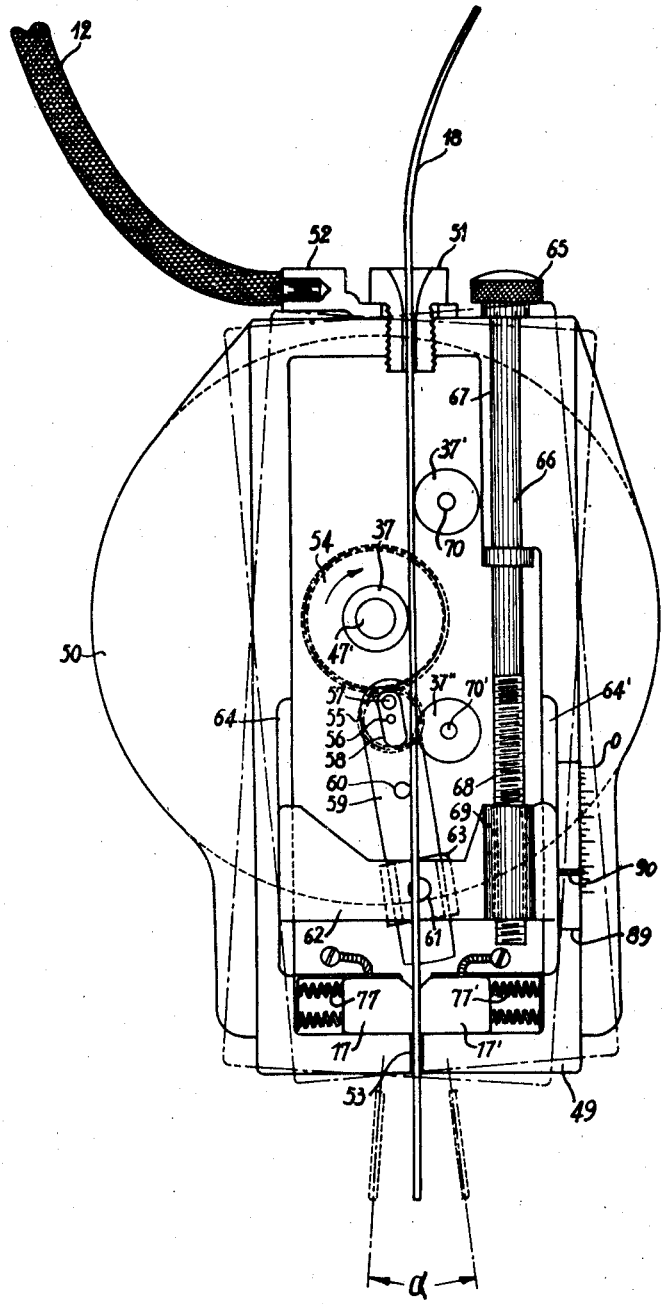
Fig. 2 shows diagrammatically the welding head with members and mechanisms for the automatic movement of the electrode.

For this purpose and as shown in Fig. 2, the welding head or its frame 49, is pivoted about the drive shaft 47' of an appropriate speed reducer not shown in the drawing and provided in a case 50 of the feed regulating motor whose shaft 47 (Fig. 1) drives the said speed reducer.

On the shaft 47' is mounted the driven roller 37 against which other rollers, such as 37' and 37'', which are loosely pivoted in the frame 49, press against the cylindrical surface of the electrode so as to engage same firmly when, as already described, said electrode is automatically "sucked" into the welding head into which its free end is inserted through a bushing or wire guide 51. Said wire guide also acts as a nut for fixing the shoe 52 of a flexible cable 12 which is intended to connect electrically the frame 49 to the welding circuit and is none other than the portion 12 of said circuit, as shown diagrammatically in Fig. 1. On the lower part and in front of the outlet 53 of the welding head or frame 49, are mounted on springs graphite brushes 17 and 17' between which the end of the electrode is directed by the action of the set of rollers 37, 37', 37'' in order to effect the supply of the welding current to the electrode when the machine is operating under load.

Behind these members for regulating the feed of the electrode and on the spindle 47', is mounted a toothed wheel 54 which meshes with a pinion 55 which is pivoted at a fixed point 56 and an eccentric pin 57 of which engages the eye 58 of the upper end of a connecting rod 59 pivoted about a pivot 60 fixed on the bottom of the case 50. Said connecting rod 59 forms a lever which has for its fulcrum the fixed pivot 60 and the upper part of which forms the arm, over the distance between the fixed pivot 60 and the pivot or axis 57, the bearing surface of said lever being formed by the lower part or end of the connecting rod 59. Said connecting rod is pivotally connected, at 61 for example, to the middle of a cross member 62 of the frame 49, so that by the rotation of the toothed wheel 54 and the consecutive rotation of the pinion 55 whose eccentric pin causes the connecting rod 59 to effect a reciprocating movement (about the fulcrum 60), the frame 49 can swing about the pivot 47' with an oscillatory movement, the amplitude $\alpha$ of which is directly proportional to the span of the lever which is determined by the distance between the fulcrum 60 and the point of pivotal connection 61.

In the embodiment shown, said pivotal connection is obtained by means of a guide collar 63 which is loosely pivoted on the movable cross member 62 forming a slider on guideways 64—64' provided on the two opposite sides of the frame 49 of the welding head. The lower end of the connecting rod 59 is engaged by the guide collar 63 in such a manner that said rod may be pivotally connected to the frame 49 in variable positions, by altering the length of the span of the lever arm which it forms and on which depends, as hereinbefore explained, the amplitude of the oscillations or swings of the frame or welding head 49.

Said amplitude can, according to the invention, be regulated and adjusted from outside the welding head. For this purpose, the knurled knob 65 of an adjusting screw 66 is acted on, the non threaded upper portion of said screw being engaged and loosely rotatable in bearing 67 of the frame 49 of the welding head. The lower threaded portion 68 of the said screw engages a corresponding threaded portion of sleeve 69 of the movable slider 62 and moves it along the guideways 64, 64' relatively to the said frame. In this manner, when the screw 66 is rotated in one direction in order to make the slider 62 move upwards, the span 60—61 is shortened, the amplitude $\alpha$ decreases, when the screw 66 is rotated in the other direction in order to make the slider 62 move downwards, the span 60—61 is lengthened and the amplitude $\alpha$ increases.

The slider 62 is provided with a needle or pointer 90 which passes through an opening 89 of the frame 49 and opposite which, as shown in Fig. 2, is a graduation. It will be seen that the amplitude of the swinging movement can thus always be adjusted beforehand on the graduation marked on the said scale. Said amplitude can be reduced to zero, i. e. the swinging may be eliminated. For this purpose, it is only necessary to rotate the knurled knob 65 until the centre of the pivot point 61 coincides with the centre 60 of the fulcrum of the lever formed by the connecting rod 59.

The rollers 37', 37'' which are shown diagrammatically in Fig. 2, are, as already stated, loosely pivoted, but their respective spindles 70, 70' can, in known manner, press the electrode 18 against the driving roller 7 by the action of springs.

In order to make it possible to use the welding head for different diameters of welding electrodes, the respective spindles 70, 70' of the rollers 37', 37'' are not secured to the frame 49. According to these diameters, it should be possible to move them away from the driving roller 37 against which the rollers 37', 37'' press the cylindrical surface of the electrode 18. The arrangement used for this purpose by the invention, for these feed regulating members which are located opposite the members for swinging the welding head, which were described in the last place, has not been shown in Fig. 2, in order to make the drawing clearer. It is shown in Fig. 3, but in the latter the members of Fig. 2 which serve to vary the amplitude of the swinging movement have not been shown, in order to make the drawing clearer.

Figure 3:
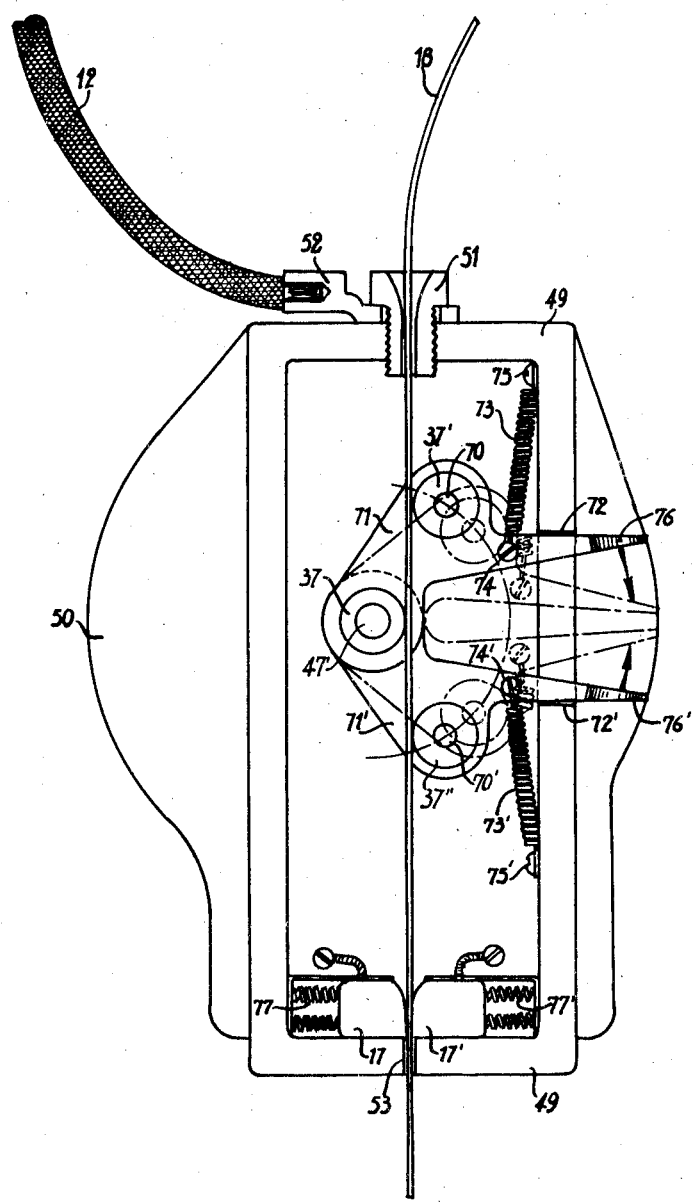
Fig. 3 shows diagrammatically an embodiment of said mechanisms, enabling electrodes of various diameters to be passed through the welding head.

As shown diagrammatically in Fig. 3, the spindles or pivots 70, 70' of the respective rollers 37', 37'' are mounted on members 71, 71' forming a lever, which are fulcrumed and pivoted about the driving spindle 47', to which the driving roller 37 is secured. The arms of said levers 71, 71' pass through a lateral slit of the frame 49 and the upper part 72 and lower part 72' of said slit form abutments against which the arms of the levers 71, 71' can bear by the action of retracting springs 73, 73' which are fixed, on the one hand to the levers at 74, 74', and on the other hand to the frame 49 at 75, 75'. The respective outer ends 76, 76' of the levers 71, 71' terminate in the shape of handles which as shown in broken lines in Fig. 3, leave the stops 72, 72' when they are moved towards one another, so that the spindles 70, 70' with their respective rollers 37', 37'' describe, as they move towards one another, an arc of a circle and move the common plane of tangency of the two pressure rollers 37', 37'' away from the driving roller 37, thereby allowing an electrode 18 of any chosen diameter to pass. When the handles 76, 76' are released, the spindles 70, 70' tend to return towards their initial position, but before they have reached their respective abutments, the corresponding rollers 37', 37'' press against the electrode 18 by the action of the pull of the retracting springs 73, 73'.

From that instant, the feed regulating motor is set in motion on no load, in order to feed the electrode automatically, as described, into the current supply members 17—17' and between which it is forced, against the action of a system of springs 77, 77', before issuing from the lower part of the frame 49 of the welding head. In order to enable the arc to be struck easily, this feed of the electrode under no load should be slow and, for this purpose, it is only necessary to fix, once and for all, the adjustment of the auxiliary voltage supplied on no load operation by the secondary 45 of the auxiliary transformer (Fig. 1).

Apart from this adjustment, the automatic machine shown is only provided with three adjustments: that for the speed of feed of the welding electrode under load, by means of the rheostat 39, the adjustment of the swinging of the welding head, by means of the knob 65 as described and the adjustment of the translation of the carriage above the work.

For the purpose of this latter adjustment, the translation motor 20 (Fig. 1) is mounted on the carriage 78 in such a manner that it can be moved relatively to said carriage by means of a screw 79, whereas its shaft 80 rests on the driving wheel 81 of a speed reducing mechanism such as 82—83, through the intermediary of a plate 84 secured to the shaft 80. The plate 84 frictionally engages the wheel 81 of the speed reducer and said speed reducer drives a knurled driving roller 85 of the carriage 78 which can thus move along a track 86, whereas it rests on the other hand on three rollers such as 87 rolling on the rail 88. It will be seen that by acting on the screw 79, the engagement ratio between the plate 84 of the driving shaft 80 and the wheel 81 is altered. Consequently, the closer the axis of said driving shaft 80 moves towards the wheel 81, the slower becomes the translatory movement of the carriage above the work and, conversely, the further the driving shaft 80 moves away from the wheel 81 and engages it towards its periphery, the faster will be the movement of the carriage.

The three adjustments described are of course accessible on the translation carriage which, for the purpose described, also carries the feed regulating motor for the electrode which passes through the welding head.

What I claim is:

1. In an automatic arc welding machine in which the electrode advances continuously towards the work by means of a motor carried by a head through which the electrode passes and in which said head is carried by a carriage movable above the work to be welded, the combination of a spindle around which said head can swing, said spindle being parallel to the direction of displacement of said carriage, a gear mounted on the same axis as that of said spindle and operated by the motor which moves the electrode, a toothed wheel meshing with said gear and carried by said head, an eccentric pin on said toothed wheel, a pivoting lever connected to said eccentric pin and fulcrumed on a fixed point, a guide collar movable along said lever, a pivot for connecting said guide collar to the head, and means for varying the distance between this pivot and the fulcrum of the lever.

2. In an automatic arc welding machine in which the electrode advances continuously towards the work by means of a motor carried by a head through which the electrode passes and in which said head is carried by a carriage movable above the work to be welded, the combination of a spindle around which said head can swing, said spindle being parallel to the direction of displacement of said carriage, a gear mounted on the same axis as that of said spindle and operated by the motor which moves the electrode, a toothed wheel meshing with said gear and carried by said head, an eccentric pin on said toothed wheel, a pivoting lever connected to said eccentric pin and fulcrumed on a fixed point, a slide movable relatively to said head, a guide collar movable along said lever, a pivot for connecting said guide collar to said slide, and means for varying the position of said slide relatively to said head in order to adjust the distance between said pivot and the fulcrum of the lever.

3. In an automatic arc welding machine in which the electrode advances continuously towards the work by means of a motor carried by a head through which the electrode passes and in which said head is carried by a carriage movable above the work to be welded, the combination of a spindle around which said head can swing, said spindle being parallel to the direction of displacement of said carriage, a gear mounted on the same axis as that of said spindle and operated by the motor which moves the electrode, a toothed wheel meshing with said gear and carried by said head, an eccentric pin on said toothed wheel, a pivoting lever connected to said eccentric pin and fulcrumed on a fixed point, a slide movable relatively to said head, a guide collar movable along said lever, a pivot for connecting said guide collar to said slide, a threaded portion in this slide, an adjusting screw which can be rotated from the exterior of the head, engaged in said threaded portion, means preventing this screw from moving axially relatively to said head, a pointer secured to said slide, and a graduated scale outside said head and in front of which said pointer is movable.

RAOUL JEAN SCHMERBER.

No references cited.